United States Patent [19]

Dattilo et al.

[11] 3,916,442

[45] Oct. 28, 1975

[54] MECHANICAL CARTRIDGE EJECT MECHANISM

[75] Inventors: Donald J. Dattilo, Mount Prospect; Alfred J. Renzetti, Elk Grove Village, both of Ill.

[73] Assignee: Motorola, Inc., Chicago, Ill.

[22] Filed: May 28, 1974

[21] Appl. No.: 473,524

[52] U.S. Cl. .................... 360/93; 242/198; 360/132

[51] Int. Cl.$^2$ ........................ G11B 23/04; G11B 15/22; G11B 19/18

[58] Field of Search ........... 360/132, 93, 92, 94, 95, 360/74; 242/55, 19 A, 198, 197, 199, 200

[56] References Cited

UNITED STATES PATENTS

| | | | |
|---|---|---|---|
| 3,485,500 | 12/1969 | Loeschner et al. | 360/93 |
| 3,632,897 | 1/1972 | Ban | 360/93 |
| 3,684,299 | 8/1972 | Clark | 360/93 |
| 3,684,300 | 8/1972 | Clark | 360/93 |
| 3,747,940 | 7/1973 | Winkler | 360/93 |
| 3,773,334 | 11/1973 | Naito | 360/93 |
| 3,812,537 | 5/1974 | Grae et al. | 360/132 |

*Primary Examiner*—Alfred H. Eddleman
*Attorney, Agent, or Firm*—Donald J. Lisa; James W. Gillman

[57] ABSTRACT

A cartridge ejection mechanism, for a magnetic tape cartridge player which includes a chassis having a support member and sidewalls to form a cartridge receiving cavity, has an ejector control coupled to an actuator lever mounted to the support member for movement in the direction of insertion of the cartridge. The actuator lever includes a projection portion which extends in the path of the cartridge when the cartridge is inserted into the playing position. The end of the actuator lever opposite the projection portion includes an angled tab which is engageable with a cam end of a bar member mounted to the support member and having a roller mounted on the end opposite the cam ends. The roller is engageable with the cartridge to hold the cartridge in playing position when the cartridge is fully inserted into the tape player. First and second arms are pivotally mounted in the chassis and engageable with each other such that the pivotal movement of the first arm engages and pivotally moves the second arm. The ejector control is connected through a linkage to the first arm to move the same. The pivotal movement of the second arm engages the bar member to move the roller away from engagement with the cartridge. The movement of the bar member results in a camming action with the actuator lever to move the cartridge away from the play position to facilitate removal of the cartridge from the player.

4 Claims, 3 Drawing Figures

MECHANICAL CARTRIDGE EJECT MECHANISM

BACKGROUND OF THE INVENTION

In magnetic tape cartridge players used in automobile and other reproducing systems, it is desirable to provide some means for removal of the cartridge from the player to prevent the occurence of deformation of the pressure roller within the cartridge which occurs if the cartridge is left in contact with the tape drive mechanism of the tape player. In many instances, the cartridge is inserted into the tape player beyond practical reach while in the playing position which thereby prevents the user from manually pulling the cartridge out of the playing position. Additionally, most mechanisms in use for accomplishing the ejection of a cartridge from the playing position involve complicated mechanical and electrical structures which employ electrical devices, such as solenoids, and electrical power to accomplish the removal of the cartridge from the playing position. Such structures result in ejection mechanisms which require and utilize considerable space within the tape player, and are complicated in structure and expensive to manufacture.

SUMMARY OF THE INVENTION

It is an object of this invention to provide a mechanical cartridge ejection mechanism which greatly reduces the force required in manually rejecting the cartridge.

It is another object of this invention to provide an improved cartridge ejection mechanism utilizing relatively few parts, which is of simple construction and reliable in operation.

It is a further object of this invention to provide a cartridge ejection mechanism which requires no electrical devices, and no electrical power to accomplish the ejection of the cartridge.

In a preferred embodiment of this invention, the magnetic tape cartridge player includes a chassis having a support member and sidewalls which form a cartridge receiving cavity. An actuator lever is mounted to the support member for movement in the direction of the insertion of the cartridge into the cartridge receiving cavity. The actuator lever includes a projection portion which extends into the path of the cartridge when the cartridge is inserted into the playing position. The end of the actuator lever opposite the projection portion includes an angled tab portion which is engageable with the cam end of a bar member mounted to the support member for transverse movement with respect to the actuator lever, and having a roller mounted on the end opposite the cam end. The roller on the bar member is engageable with the cartridge to hold the cartridge in playing position when the cartridge is fully inserted into the tape player.

First and second L-shaped pivot arms are pivotally mounted on the chassis such that the first pivot arm is engageable with the second pivot arm. Upon the pivotal movement of the first arm, the first arm engages and pivotally moves the second arm. The second L-shaped arm is positioned on the chassis to be engageable with the bar member, such that upon the pivotal movement of the second arm, the second arm engages the bar member to move the bar member and roller thereon away from engagement with the cartridge. The attendant movement of the bar member results in a camming action between the cam end of the bar member and the angled tab portion of the actuator lever whereby the actuator lever is moved and the projection portion thereon engages the cartridge and moves the same away from the playing position to permit the removal of the cartridge from the player.

DETAILED DESCRIPTION

Figures 1, 2:
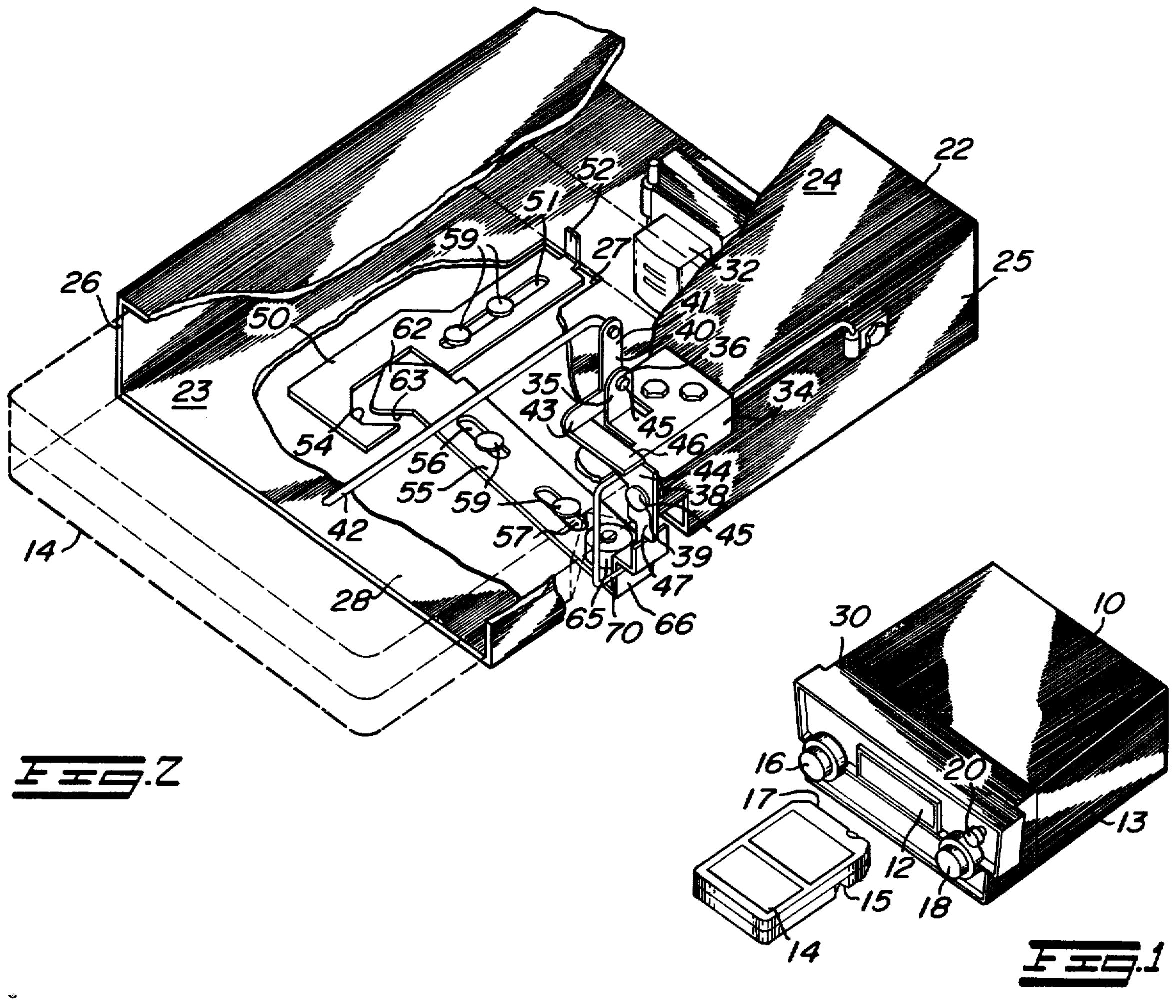
FIG. 1 is a perspective view of a magnetic tape cartridge player utilizing the cartridge ejection mechanism of this invention.
FIG. 2 is a cross-sectional view showing the cartridge inserted into the magnetic tape cartridge player in the playing position.

Referring now to FIG. 1, there is shown a perspective view of a magnetic tape cartridge player 10 including a housing 13 having an entryway 12 therein into which is readily insertable a tape cartridge 14. The cartridge 14 contains a quantity of magnetic tape therein having audio signal information thereon, a notch 15 formed on the side thereof and a front wall 17. The magnetic tape cartridge player 10 includes volume and tone controls 16 and 18 respectively, which permits the user to operate the tape player 10. Additionally, the tape player 10 includes an ejector control 20 for controlling the ejection mechanism of the present invention as will hereinafter be described.

Figure 3:
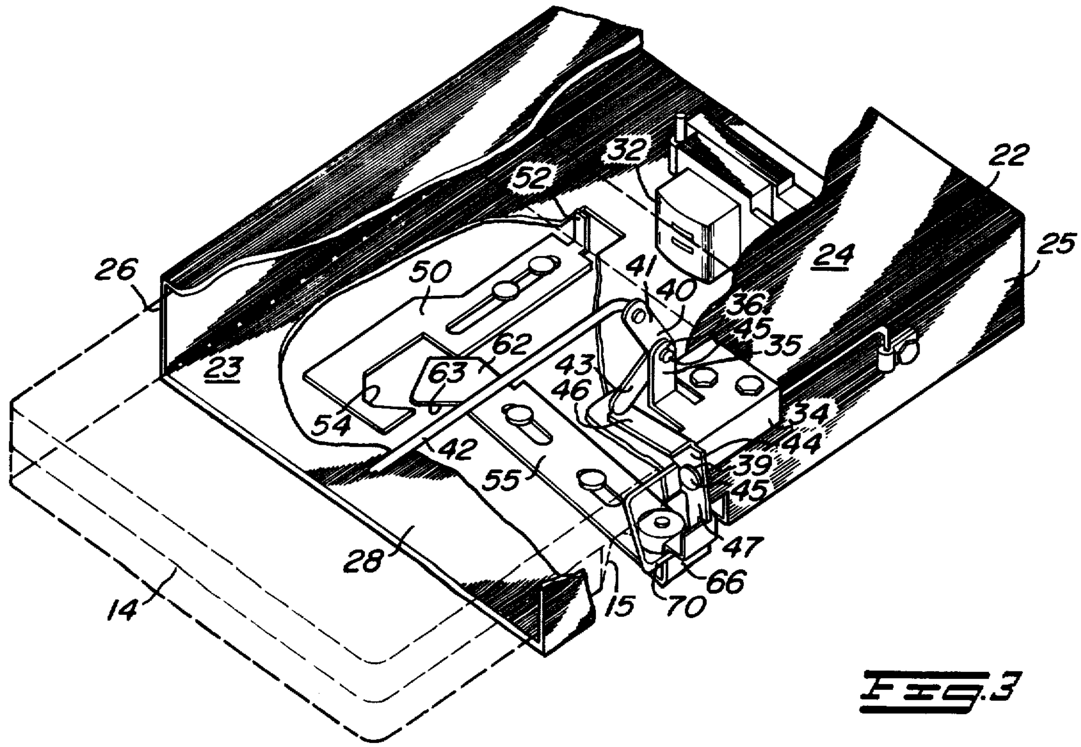
FIG. 3 is a cross-sectional view showing the cartridge ejection mechanism moving the cartridge away from the playing position in accordance with this invention.

Referring now to the drawings in greater detail, wherein like numbers have been used throughout the various views to designate similar parts, there is illustrated in FIGS. 2 and 3, a magnetic tape cartridge player 10 in which the mechanical cartridge ejection mechanism according to the invention is employed. The tape player 10 includes a chassis 22 having a support member 23 and top member 24 connected to a pair of sidewalls 25 and 26, which define and form a cartridge receiving cavity 28 having a cartridge entryway 12 through which the cartridge 14 is received. A bezel or escutcheon plate 30 (FIG. 1) may be attached to the housing 13 to define the cartridge entryway 12. The housing 13 (FIG. 1) is fitted over the chassis 22 and attached to the bezel 30 to complete the tape player structure.

Mounted on the support member 23 between the sidewalls 25 and 26 in communication with cartridge receiving cavity 28, is a magnetic tape head 32 which cooperates with the magnetic tape within the cartridge 14 to reproduce sound signals therefrom. Apparatus (not shown) is provided to cooperate with the magnetic tape in the cartridge 14 to drive the same at a uniform speed past the tape head 32.

The cartridge ejection mechanism according to the invention, includes a bracket 34 mounted to the top member 24 and sidewall 25 of the chassis. The bracket 34 includes a first bracket arm 35 extending upwardly therefrom and having an opening 36 therein, and a second bracket arm 38 extending outwardly therefrom and having an opening 39 therein.

Pivotally mounted to the first bracket arm 35 by rivet 45 is a first L-shaped arm 40 having a first lever portion 41 connected by linkage or rod 42 with ejector control 20 (FIG. 1) and a second lever portion 43. A second L-shaped arm 44 is mounted by rivet 45 to the second bracket arm 38. The second L-shaped arm 44 includes a first lever portion 46 and a second lever portion 47. The first and second L-shaped arms 40 and 44 are mounted on mounting bracket 34 such that the pivotal movement of the first lever portion 41 of first L-shaped arm 40 causes the second lever portion 43 thereof to engage the first lever portion 46 of second L-shaped arm 44, thereby causing the same to pivot about the axis provided by rivet 45. The second lever portion 47 of the second L-shaped arm 44 is thereby positioned to engage a flange portion of the cartridge locking mechanism, as will hereinafter be described.

The ejection means or mechanism of the present invention includes an actuator lever 50 and a bar member 55 which are mounted for sliding movement with respect to the support member 23. The actuator lever 50 includes a slot 51 therein and the bar member 55 includes a pair of slots 56 and 57 therein through which fasteners such as rivets 59 extend, to retain the actuator lever 50 and bar member 55 in a mounted relationship below the support member 23. Actuator lever 50 is mounted to the support member 23 for sliding movement in the direction of insertion and withdrawal of cartridge 14 into and out of cartridge receiving cavity 28 of the tape player 10. The actuator lever 50 includes a dependent member or projection portion 52 which extends through an opening 27 in support member 23 into the path of the cartridge 14 when the cartridge is inserted into the cartridge receiving cavity 28. The actuator lever 50 is movable between a forward at rest position and an inward play position when the cartridge 14 is fully inserted into the play position. The opening 27 in support member 23 is provided to permit movement of projection portion 52 in accordance with the insertion and withdrawal of cartridge 14. The end of the actuator lever opposite the projection portion 52 includes an angled tab portion 54 thereon which is engageable with the bar member 55, as will hereinafter be described.

As shown in FIGS. 2 and 3, the bar member 55 is mounted for movement substantially perpendicular to the movement of actuator lever 50. An end portion 62 includes a cam surface 63 thereon which is engageable with the angled tab portion 54 of actuator lever 50. The cam surface 63 controls the rate of the cartridge ejection, as will hereinafter be described.

Opposite the end portion 62 on bar member 55 there is mounted a cartridge retaining roller 65 and a flange portion 66, which flange portion is engageable with the second lever portion 47 of the second L-shaped arm 44. Spring means 70, mounted to the sidewall 25 of the chassis 22 is engageable with the flange portion of bar member 55 to bias the bar member 55 toward the actuator lever 50 from a second position clear of the cartridge receiving cavity 28 to a first position wherein the retaining roller 65 engages notch 15 of cartridge 14 to hold the cartridge in the playing position.

Referring now to FIGS. 2 and 3 of the drawings, the operation of the cartridge ejection mechanism according to the invention will be described. Prior to the insertion of cartridge 14 into the cartridge receiving cavity 28, the bar member 55 and the actuator lever 50 are positioned as shown in FIG. 3, wherein lever 50 engages end portion 62 of bar member 55 to hold the roller 65 thereon clear of the cartridge receiving opening. Upon the insertion of a cartridge 14 into the cavity 28, the front wall 17 of the cartridge engages projection portion 52 of actuator lever 50. Further insertion of the cartridge 14 into the cartridge receiving cavity 28 moves the actuator lever 50 toward the magnetic tape head 32. As the actuator lever 50 is moved inwardly, a point is reached wherein actuator lever 50 disengages the end portion 62 of bar member 55 and the spring means 70, engageable with the flange portion 66 of bar member 55, biases the bar member and cartridge retaining roller 65 into the cartridge receiving cavity 28. Such movement results in the roller 65 engaging the notch 15 in cartridge 14 to securely hold the cartridge in the inward playing position, as shown in FIG. 2.

When it is desired to remove the cartridge from the cartridge receiving cavity 28, ejector control 20 is pulled outwardly, thereby causing the first L-shaped arm 40 to pivotally rotate about bracket arm 35. Such pivotal movement causes the second lever portion 43 of the first L-shaped arm 40 to engage the first lever portion 46 of the second L-shaped arm 44 to pivotally move the same. Such movement of the second L-shaped arm 44 causes the second lever portion 47 to engage the flange portion 66 of the bar member 55 and move the same outwardly from the cartridge receiving cavity 28. Such movement of the bar member 55 results in a camming action between the cam surface 63 on end portion 62 with the angled tab portion 54 of actuator lever 50. The resultant camming action causes the actuator lever 50 to move forwardly to return and pull the cartridge 14 away from the playing position thereby permitting the user to manually remove the cartridge from the cartridge receiving cavity 28.

The cartridge ejection mechanism of the present invention eliminates the need for extracting the cartridge by hand from the playing position in the cartridge receiving chamber in tape deck designs wherein the cartridge is inserted beyond practical reach while playing. Moreover, the force required to pull the ejector control is considerably less than that required to manually extract the cartridge from magnetic tape player.

We claim:

1. In a magnetic tape player having a housing with an opening therein to receive a cartridge having magnetic tape therein, the player having a transducer head positioned adjacent the cartridge receiving opening for cooperation with the tape in the cartridge, a manual cartridge eject mechanism comprising:

actuator means mounted for sliding movement in the housing between an outward at rest position and an inward play position, the actuator means having a projecting member on one end, the projecting member being engageable with the cartridge as the cartridge is inserted into the cartridge receiving opening;

locking means slideably mounted in the housing for movement in a direction substantially perpendicular to the movement of the actuator means and formed for camming engagement with the actuator means, the locking means having a roller mounted on one end thereof, the locking means moveable between a first position wherein the roller holds the cartridge in a fully inserted play position against the transducer head and a second position wherein the roller is clear of a cartridge in the cartridge receiving opening;

spring means mounted in the housing for biasing the locking means into the first position;

a first L-shaped arm pivotally mounted in the housing; and a second L-shaped arm pivotally mounted in the housing for movement in a plane substantially perpendicular to the plane of movement of the first arm, the first arm being positioned to engage and move the second arm, the movement of the second arm causing the same to engage the locking means to move the same from the first position to the second position, movement of the locking means causing a camming action between the locking means and the actuator means whereby the actuator means is moved outwardly, the projecting member thereof moving the cartridge away from the play position.

2. The magnetic tape player according to claim 1 wherein the camming engagement between the actuator means and the locking means also controls the movement of the locking means into the first position.

3. The magnetic tape player according to claim 1 wherein the spring means is a torsion spring.

4. The magnetic tape player according to claim 1 further including ejection control means and wherein the ejection control means includes an ejection button and linkage means for coupling the ejection button to the first L-shaped arm, the ejection button being moveable to cause the linkage means to move the first arm to thereby engage the second L-shaped arm to move the locking means from the first position to the second position.

* * * * *